Figure 1:
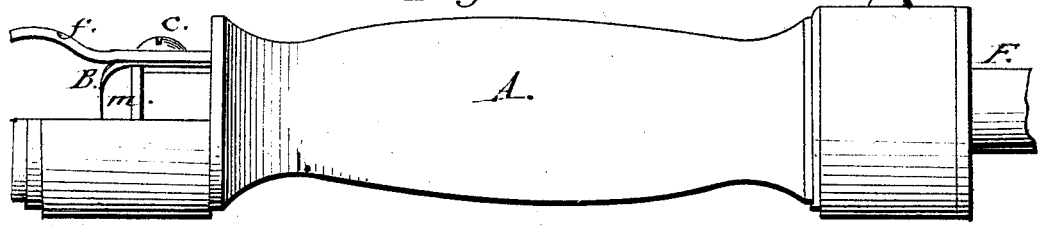

2 Sheets, Sheet 1.
Johnson Boyle & Collender,
Cutting Leather.
No. 94,317. Fig. 1. Patented Aug. 31, 1869.
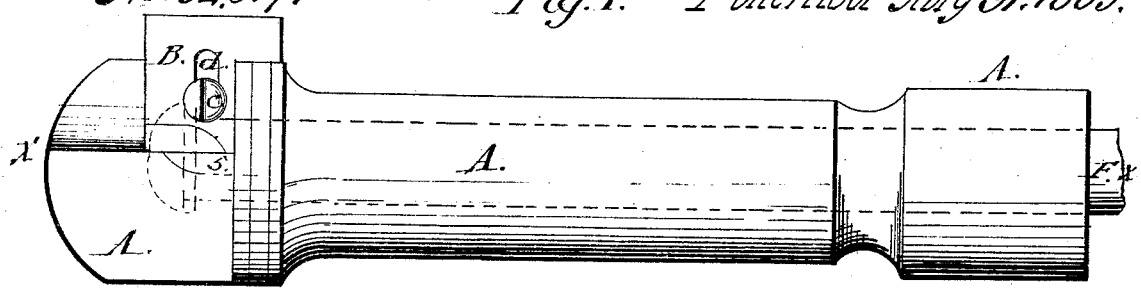
Fig. 2.
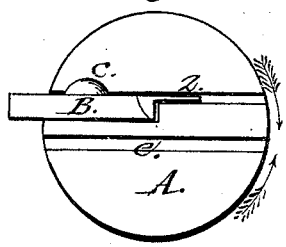
Fig. 3. x.x.
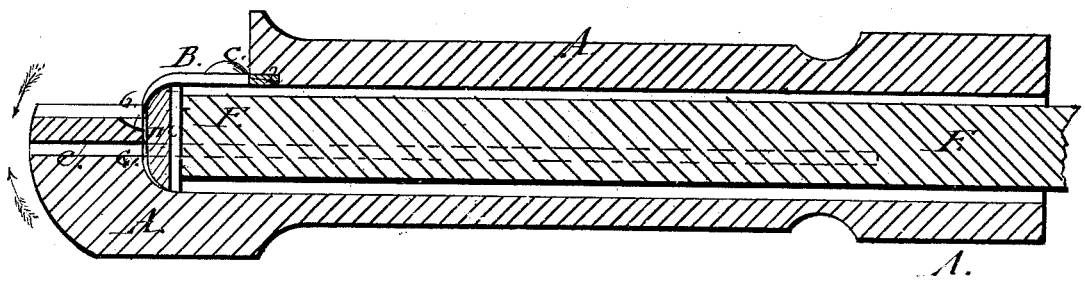
Witnesses:
Fredrick Layr
Chas A ...
Inventors:
Johnson Boyle & Collender
By atty
John ...
N. PETERS, PHOTO-LITHOGRAPHER, WASHINGTON, D. C.

Johnson Boyle & Collender.

Cutting Leather.

No. 94,317. Patented Aug 31, 1869.

Witnesses:
Frederic A Sayer
Chase Hutt

Inventors:
Johnson Boyle and Collender
By atty
J McGuire

United States Patent Office.

LUTHER A. JOHNSON, H. W. COLLENDER, AND JAMES E. BOYLE, OF NEW YORK, N. Y., ASSIGNORS TO MICHAEL PHELAN, H. W. COLLENDER, AND JAMES E. BOYLE, OF SAME PLACE.

Letters Patent No. 94,317, dated August 31, 1869.

IMPROVED CUE-LEATHER TRIMMER.

The Schedule referred to in these Letters Patent and making part of the same.

*To all whom it may concern:*

Be it known that we, LUTHER A. JOHNSON, H. W. COLLENDER, and JAMES E. BOYLE, of New York city, in the county of New York, in the State of New York, have invented certain new and useful "Improvements in Machines for Trimming Cue-Leathers;" and we do hereby declare that the following is a full and exact description thereof, reference being had to the accompanying drawings, making part of this application.

Our invention relates to certain improvements in machines for trimming cue-leathers.

Previous to our invention it has been suggested to perform the trimming or cutting down of the leathers or tips of billiard-cues by means of a machine adapted to receive the end of the cue, and shave or cut down the leather into proper shape, and Letters Patent of the United States were granted on the 4th day of May, 1869, to James E. Boyle for such a machine, in which the cue is turned or rotated within a holder or tube, provided with one or more cutters or knives, which latter trim down the leather to the diameter of the cue without danger of loosening the former, and it is suggested in and contemplated by the said Letters Patent, that in lieu of turning the stick, the machine or cutting-mechanism may be turned.

The machine described in the said Letters Patent, although embodying the same principle as embraced in our improved machine, so far as confining the leather to or holding it toward the cue while being cut, is subject to numerous objections, on account of the knives not being formed so as to round over or chamfer off the tips, the cost of manufacture, and its inadaptability to be used in the hand conveniently.

To overcome these objections and provide a machine or implement which shall be economic of manufacture, will round over the leather, and in every way operate with greather expedition and facility, is the main object of our invention, which consists in a cue-leather trimmer composed of a simple tubular holder or hand-piece, within which the cue is inserted, provided with a single cutter or knife, adapted to shave or turn off the periphery of the tip, and simultaneously chamfer or round over its edge, the whole so constructed and operating, that by holding the implement in one hand, and turning the cue within it by the other hand, the trimming up into perfect shape of the leather may be efficiently and expeditiously performed, as will be hereinafter more fully explained.

To enable those skilled in the art to make and use our improved machine, we will proceed to describe the construction and operation of the same, referring by letters to the accompanying drawings, in which—

Figure 2:
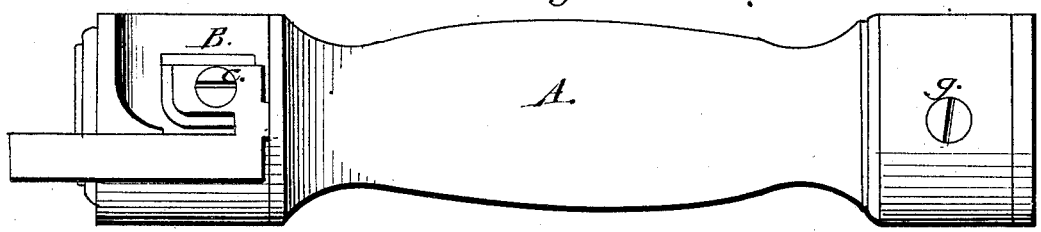
Figure 3:
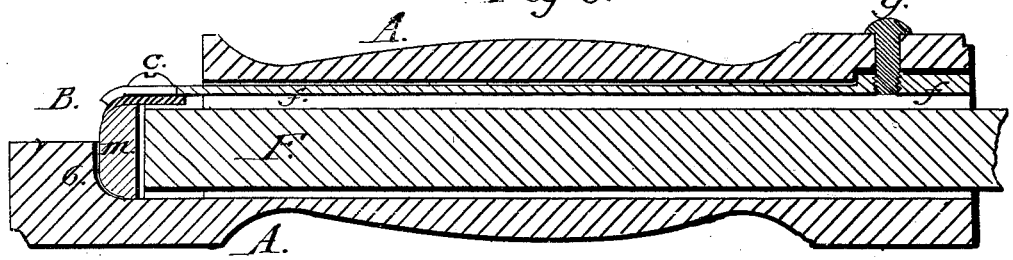

Figures 1, 2, and 3, plate 1, are elevation, end view, and longitudinal section of the machine, and Figures 1, 2, and 3, plate 2, are side and front elevations and longitudinal section of a modification, in which the knife is attached to a spring-bar.

In the several figures the same part is designated by the same letter of reference.

At plate 1, A is a tubular holder, which we propose to make of about the size and shape shown, of a suitably hard and tough wood. It is formed with a cylindrical hole extending from one end through to near the other end, which is cut away, as clearly shown, and is provided with cutter or knife B, which is secured by means of a screw, c, passing through a slot, d, in said knife, into the holder A, so that by loosening the said screw, the knife B can be set up or adjusted as it wears away.

The knife B, as seen, is so formed that it will hook over the tip, and cut both the periphery and round over toward the centre.

The holder A is slitted down, or a saw-kerf made in it at e, as shown, leaving the stock united near the but sufficiently to avoid any liability of the severance of the parts, and so that the two portions, each side of the slot e, may be sprung toward each other, in the directions indicated by the arrows.

F represents part of a billiard-cue with one of the usual leathers or tips m on it, and inserted in the holder-tube A, ready to be operated upon.

The operation of the machine is as follows:

Suppose the end of a billiard-cue to be inserted as seen in the drawings, the operator grasps the holder A in one hand, while with the other hand he grasps and turns the cue F.

In the act of grasping and holding the tube A, the two parts are sprung toward each other in such a manner that one portion of A presses the cue-leather and cue toward the other part, and against the knife B, which, as the cue is rotated, shaves off the leather m.

The stock of the holder at the edge 5, (see fig. 1,) where the wood is cut away, rests in contact with the periphery of the leather in advance of the cutting-edge of knife B, and forms a stop, so that the knife, no matter how hard the parts of A are pressed together, can only cut off a shaving of a given thickness, so as not to render liable the tearing off of the leather.

The greater part of the cutting is done on the periphery of the leather m, which is cut down until the stop or plain part 2, (see figs. 2, 3,) of the blade B comes in contact with the cue F, but the hooked or bent-over portion of the knife also cuts some, and chamfers or rounds over the tip m. As the cue is turned it is gently pressed endwise up in the holder, so as to force the leather up against the stop-surface at b b, (see fig. 3,) and also up against the curved part of knife B.

By means of the machine described, operating as just explained, we are enabled to very rapidly and perfectly trim the tips $m$ down to the diameter of the cue, and shape them ready for the use of the player.

It will be seen that the machine just described may be very cheaply manufactured, and will be very efficient and durable, and not liable to get out of order, or require adjustment.

Whenever the knife B is dull, it may be removed by taking out the screw, and after having been sharpened, may be replaced by any one with ordinary judgment, so as to work perfectly.

At plate 2, in lieu of having a fixed or stationary knife, and the tube slotted, so as to spring together to force the leather against the cutting-surface, the holder A is made solid, and the knife B is attached to the end of a spring-bar, $f$, secured at its root by a screw, $g$, to the tube A, as clearly seen.

In the operation of this modified form of machine, the knife is pressed down on to the cue-leather in lieu of the latter being forced up toward the knife, as in the other form of the machine, the leather comes up against the stop-surface at 6, (see fig. 3,) and the knife B is so shaped as to round over or chamfer off the tip $m$.

We deem the form shown at plate 1 to be the best way of carrying out the invention.

It may be found practical to curve the knife over far enough, and so construct it, that it will come against the apex of the cue-leather, and form the stop-surface, so that the stock of A could be bored clear through, but this would be of little advantage, and a ready means for the extrication of a tip, should one come off, is provided in the slot $e$, plate 1, into which a knife-edge or wire may be inserted, to force the disengaged leather down to the open end of tube A.

Having fully explained our invention, so that those skilled can understand it, and not wishing to be understood as laying any claim to the broad principle or mode of operation common to both our improved machine and the machine patented to James E. Boyle,

What we claim as new, and desire to secure by Letters Patent, is—

1. A cue-leather trimmer, composed of a hand-tube or holder and a cutting-blade or blades, adapted to both shave off the periphery of and round over or chamfer off the leather, substantially as described.

2. Making the holder A with a slot or slit, so that its parts may be sprung together, to bring the cue up to the stationary cutting-mechanism, substantially as described.

In testimony whereof, we have hereunto set our hands and seals, this 19th day of July, 1869.

L. A. JOHNSON. [L. S.]
H. W. COLLENDER. [L. S.]
J. E. BOYLE. [L. S.]

Witnesses:
  CHAS. A. SCOTT,
  J. N. MCINTIRE.